Figure 1:
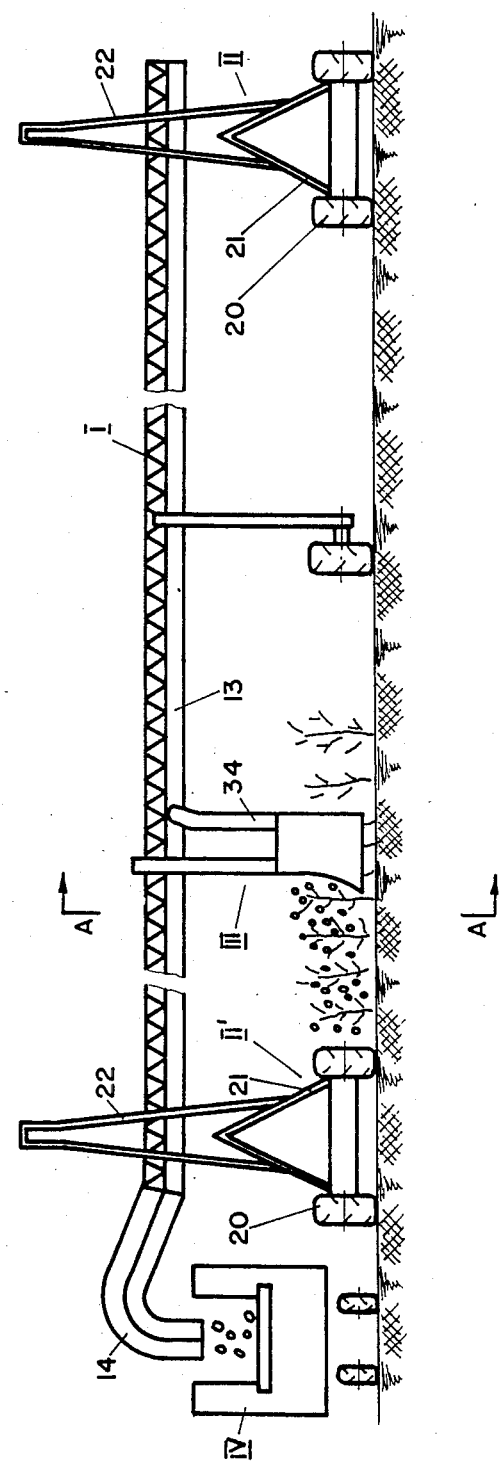

United States Patent [19]

Manor

[11] Patent Number: 4,704,851
[45] Date of Patent: Nov. 10, 1987

[54] AGRICULTURAL TRANSPORT SYSTEM

[75] Inventor: Gedalyahu Manor, Haifa, Israel

[73] Assignee: Technion Research & Development Foundation, Haifa, Israel

[21] Appl. No.: 854,556

[22] Filed: Apr. 22, 1986

[51] Int. Cl.$^4$ .................. B65G 53/24; B65G 37/00; A01D 46/26

[52] U.S. Cl. .................. 56/328 TS; 56/13.3; 56/16.6; 198/303; 198/570; 239/289; 239/723; 406/40; 406/77; 406/115; 414/507

[58] Field of Search ............ 406/39, 40, 41, 44, 406/77, 115, 116; 56/13.1, 13.3, 16.4, 16.6, 328 TS, 329; 239/289, 723, 726; 172/23–26, 413; 414/507, 508; 198/303, 306, 570

[56] References Cited

U.S. PATENT DOCUMENTS

| | | | |
|---|---|---|---|
| 3,186,493 | 6/1965 | Barry | 172/26 X |
| 3,305,113 | 2/1967 | Gardner | 414/508 |
| 4,206,840 | 6/1980 | Hanson | 198/303 X |
| 4,365,764 | 12/1982 | Marx | 406/115 X |
| 4,376,602 | 3/1983 | Landmark et al. | 406/115 |

Primary Examiner—Jeffrey V. Nase
Attorney, Agent, or Firm—Frishauf, Holtz, Goodman & Woodward

[57] ABSTRACT

A power-driven structure comprises a long grider (I) supported at its both ends by self-propelled carriages (II) which raise and lower the girder, the implement being designed for travel across planted fields or orchards without compacting the soil. Various implements, such as a cotton harvester (34), a potato picker (VIII) or a fruit collecting device may be suspended from, and propelled along, the girder (I). A mechanical conveyor (15) extends along the top of the girder, and a pneumatic conveyor system (13) is arranged underneath the mechanical conveyor. The pneumatic conveyor system is provided with spaced nozzles (40) for connection to flexible suction pipes (34).

20 Claims, 13 Drawing Figures

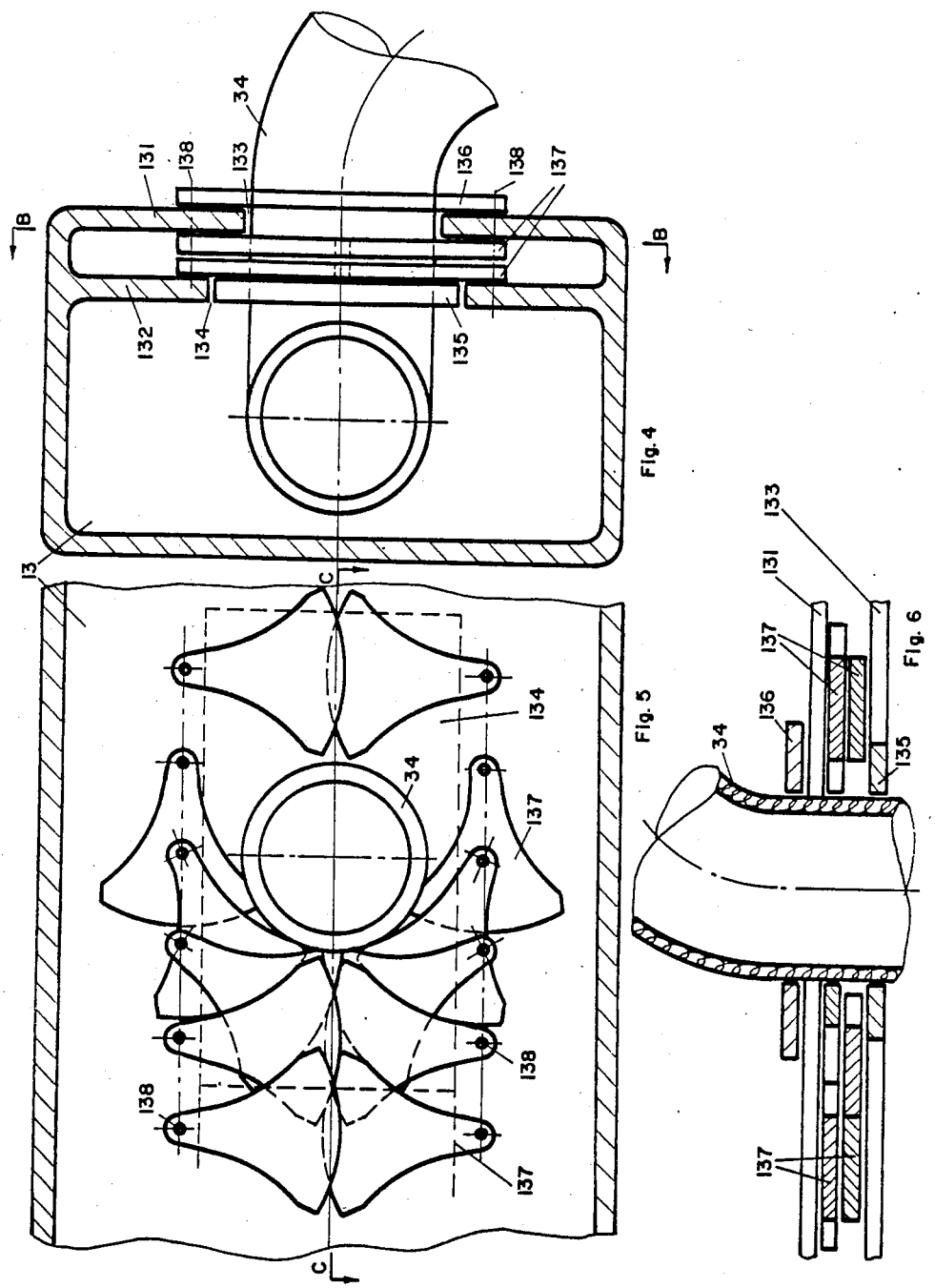

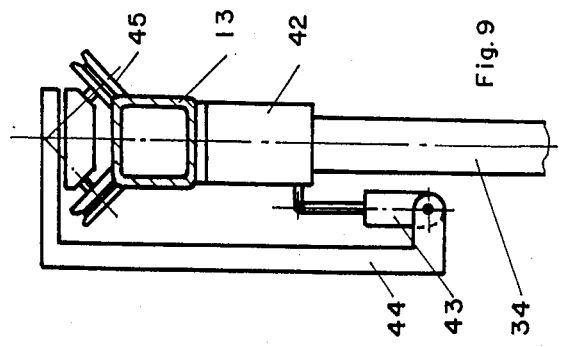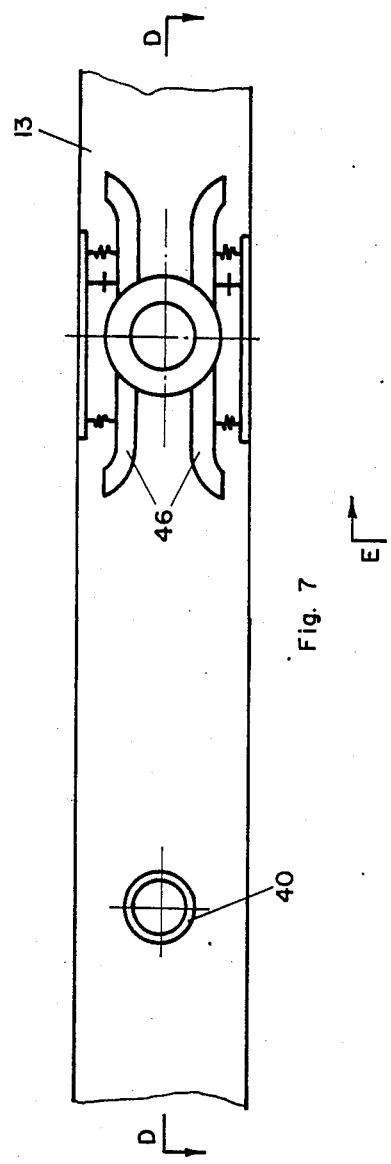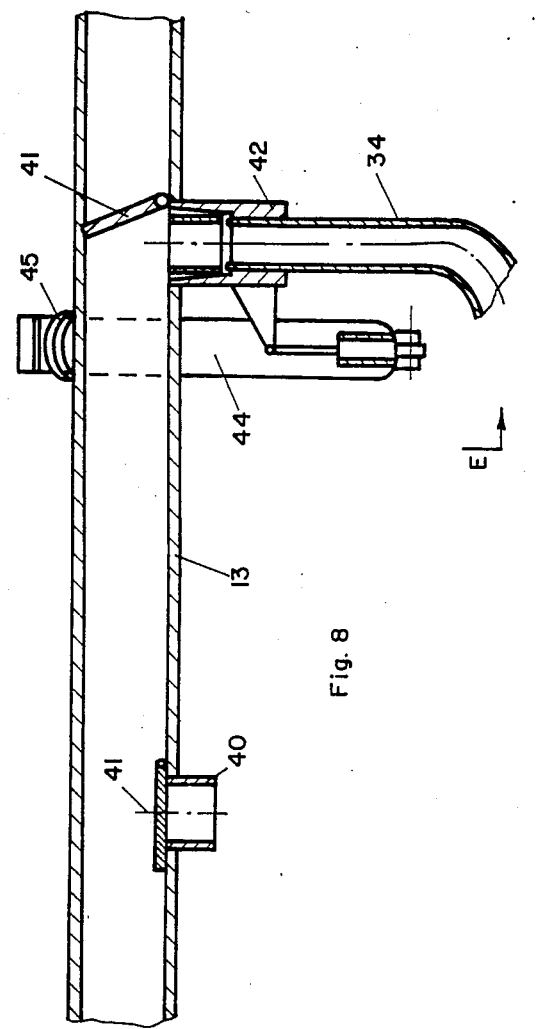

AGRICULTURAL TRANSPORT SYSTEM

BACKGROUND OF THE INVENTION

The invention relates to a power-driven structure adapted for the attachment thereto of various known agricultural implements and for their translation across a field without danger of soil-compaction. It relates more particularly to a power-driven girder structure provided with transport means serving either to carry harvested agricultural products to one of the ends of the structure, there to be collected and transported out of the planted area, or to spread materials over the field.

Every operation in planted areas, such as the distribution of fertilizers or of chemicals, harvesting crops and their transport out of the area, is nowadays carried out by relatively heavy implements which are either self-propelled or trailed by agricultural tractors. These operations invariable lead to a compaction of the soil over which the implements travel, a fact which has been long recognized as detrimental to the soil as well as to the plants, reducing their yield. Various means have lately been devised with a view to avoiding the compaction of the soil as far as possible, such means including laying rail tracks, providing the tractors and other vehicles with extra wide tyres, or drawing the implements across the field by steel cables attached to stationary winches and the like located at opposite ends of each field, similar to the steam ploughs of the 19th century.

However, no system has been devised up to now whereby equipment can be moved across a field without its being in contact with the ground, but capable of carrying out practically all operations involved in the treatment of soil and plants, harvesting the crop, and transporting it to collecting points outside the planted area.

It is therefore, a main object of the invention to provide a structure which is supported as its two end portions of a planted area by self-propelled carriages.

It is a further object to provide this structure with means for translating various agricultural implements across a field without their contacting the ground. These implements, which serve, among other tasks, for the distribution of solid or liquid chemicals, for harvesting crops and their conveyance out of the planted area, and for removing stones, crop residues, and other particulate materials, from the area treated, area adapted for attachment to the structure of the invention, which in turn is adapted for such attachment.

It is yet another object of the invention to provide the structure with means adapted, on the one hand, to raising it to a sufficient height in order to enable it to be moved over the tops of fruit trees and other tall obstacles, and on the other hand to lowering it to within a small distance from the ground for loading the harvested agricultural products, particulate matter, etc., onto horizontal moving equipment integral with the structure of the invention, for the purpose of conveying them to vehicles and the like, which carry them out of the planted area.

SUMMARY OF THE INVENTION

The power-driven structure of the invention comprises a longitudinal, substantially horizontal girder supported at both its ends by carriages adapted to travel in a direction perpendicular to the axis of the girder. The carriages are provided with synchronized means for raising the girder in such a manner as to maintain it horizontally and to a height permitting it to travel across the tops of the highest plants, e.g. fruit trees, in the plantation, and to lower it close to the ground between the rows of the plants or trees, for fruit and vegetables tob e loaded onto it, or for other operations, such as picking cotton seed, digging and collecting potatoes, and the like.

In a preferred embodiment of the invention, implement conveyor means are mounted on the girder, such means being either mechanical for example belt or chain conveyors, or pneumatic, in the form of a duct carrying a unidirectional air stream.

The girder is additionally provided with guide means serving to support and to translate, in a longitudinal direction, various agricultural implements, such as cotton harvesters, potato collectors, fertilizer spreaders, chemical spraying apparatus and other equipment used in connection with the treatment of soil and plants and with harvesting agricultural produce.

In a preferred embodiment of the invention the girder is provided with a pneumatic air duct adapted for a movable connection to a suction pipe or hose travelling along the girder and serving to feed cotton seed picked by a picker, into the air duct for conveyance to a container positioned close to one of the carriages at the end of the girder.

SHORT DESCRIPTION OF THE DRAWINGS

Figure 2:
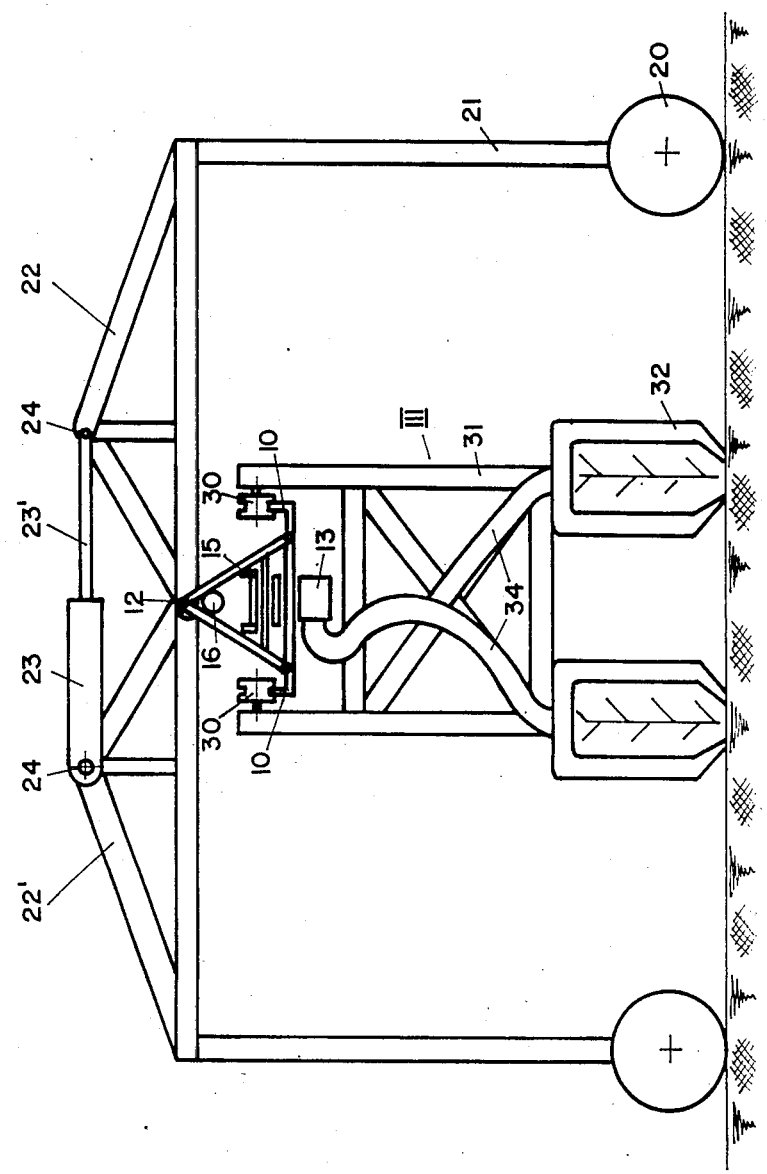
Figure 3:
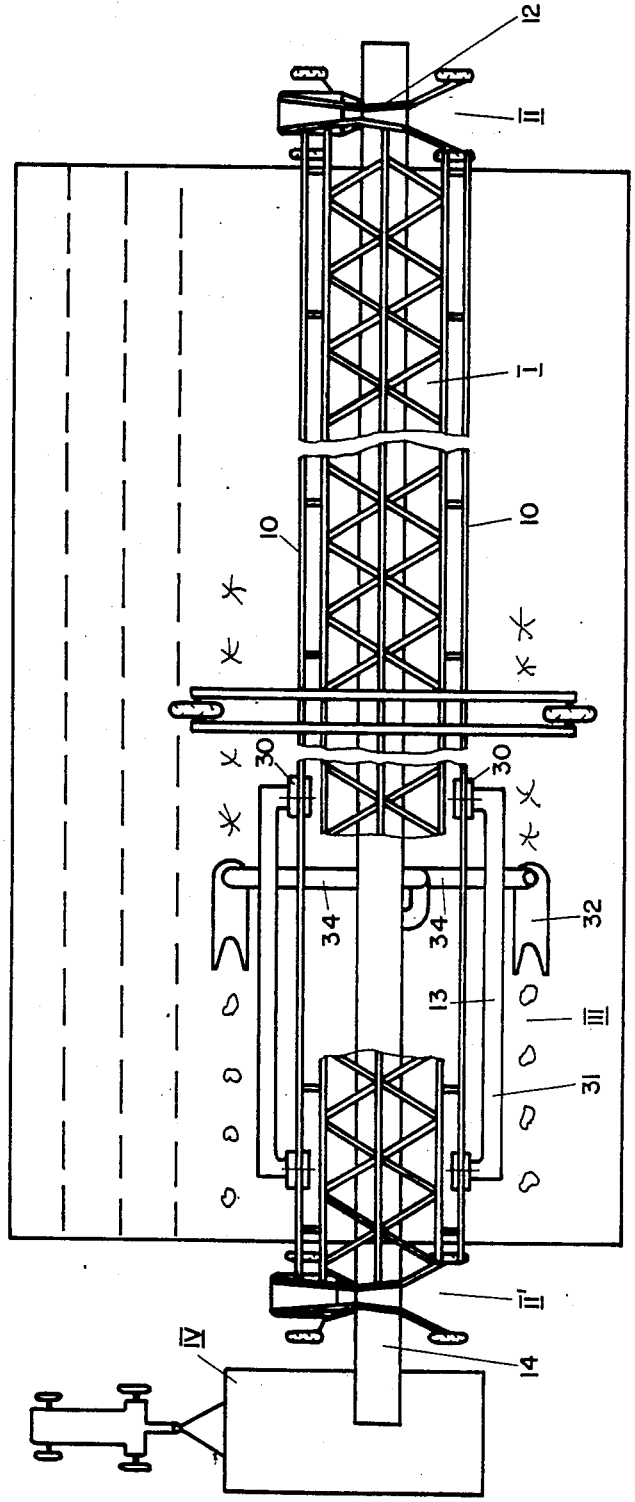
Figure 10:
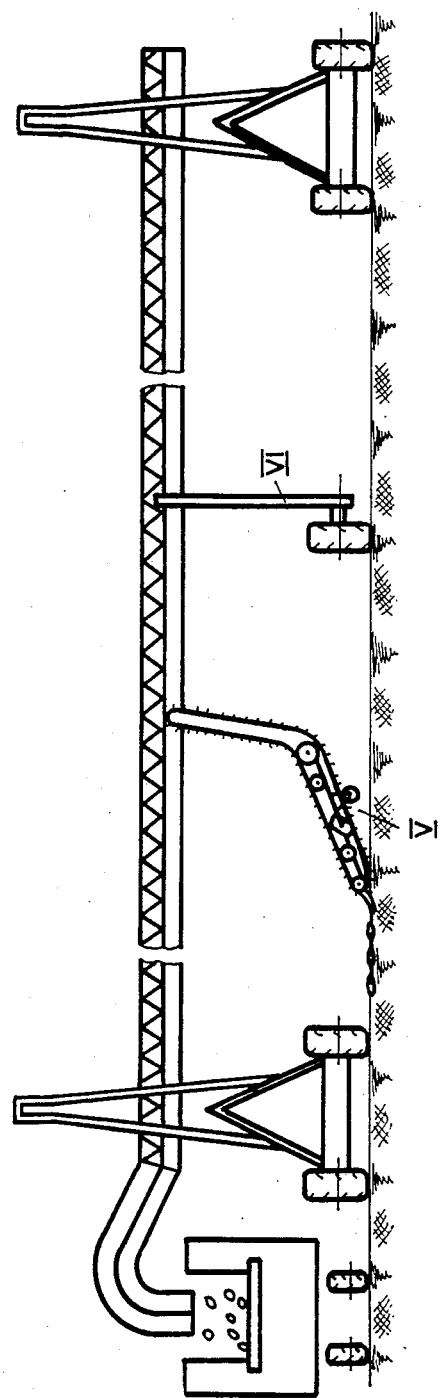
Figure 11:
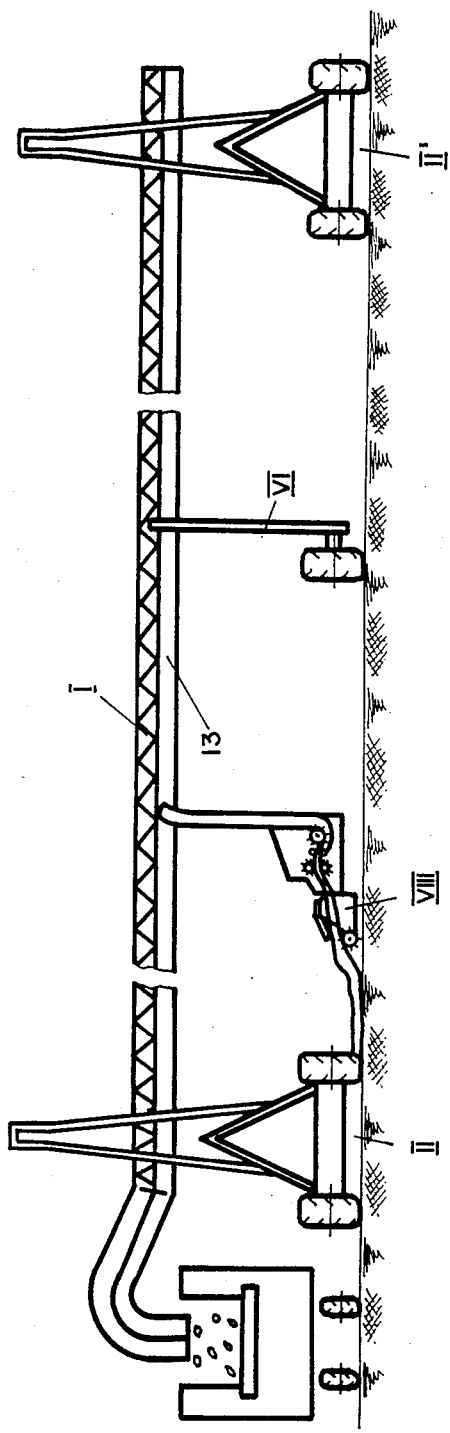
Figure 12:
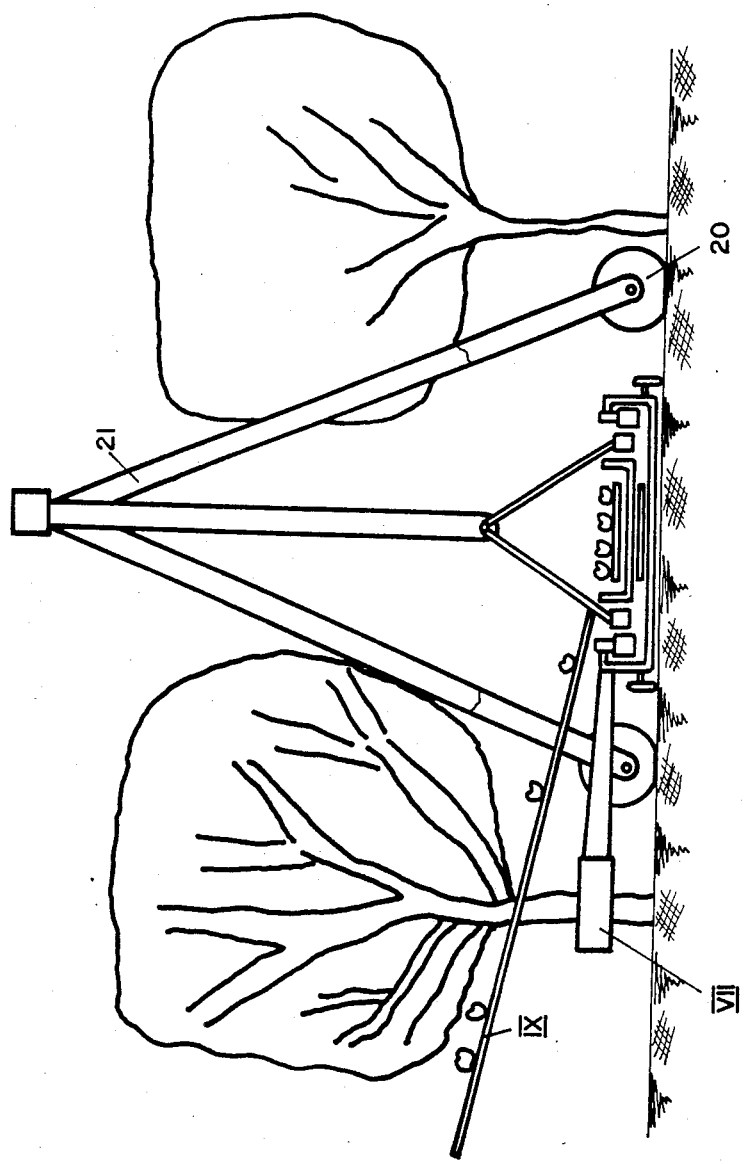
Figure 13:
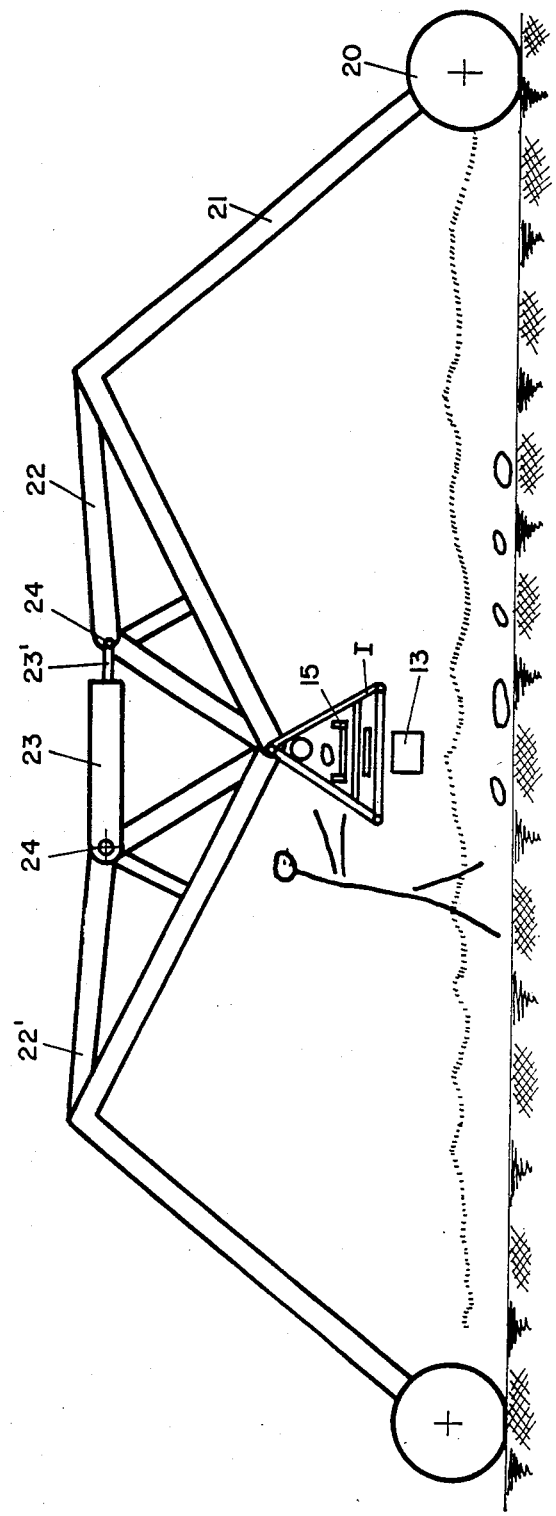

FIG. 1 is a sive view of the equipment adapted for picking and conveying seed cotton, FIG. 2 is a section along line A—A of FIG. 1, FIG. 3 is a plan view of the equipment shown in FIG. 1, FIG. 4 is a cross section of a pheumatic duct attached to the equipment of FIG. 1 showing a translatable connection of a flexible pipe to the pneumatic duct, FIG. 5 is a section along line B—B of FIG. 4, FIG. 6 is a section along line C—C of FIG. 5, FIG. 7 is a side view of a pneumatic duct provided with spaced nozzles adapted for connection of the duct to a flexible pipe, FIG. 8 is a section along line D—D of FIG. 7, FIG. 9 is a section along line E—E of FIG. 8, FIG. 10 is a side view of the equipment shown in FIG. 1 adapted for picking and transporting of potatoes, FIG. 11 is a side view of the equipment shown in FIG. 1 adapted for harvesting and transporting green forage, FIG. 12 is an end view of the equipment shown in FIG. 1 illustrating the girder lowered down to the ground, as well as a tree-vibrating apparatus for collecting and transporting fruit in an orchard, FIG. 13 is an end view of the equipment shown in FIG. 1 having the girder lowered to the height of a person, for manual collection and conveying of melons and other vegetables.

DESCRIPTION OF SOME PREFERRED EMBODIMENTS

Referring to FIGS. 1, 2 and 3, of the drawings the equipment adapted for picking and collecting seed cotton comprises a horizontal girder I of great length which is supported at its ends by two self-propelled carriages II and II'. A center support is provided (as shown in FIG. 1), if needed. The girder shown has a triangular cross section, but it is understood that square or rectangular cross sections may be employed whenever they appear to be suitable for the purpose. Two rails 10 extend along the sides of the girder which, at two points 12 is suspended from members of the carriages. A pneumatic duct 13 extends along the underside of the girder and ends beyond the carriage II' in a spout 14. A belt conveyor 15 is positioned inside the girder structure and extends over its entire length for delivering harvested products through the spout 14.

A pipe 16 (see FIG. 2) is fastened inside the girder and extends along the apex of the triangular structure; it serves to carry irrigation water, or liquid fertilizers, insecticides and the like material for distribution across the field.

Each carriage is supported by four tyred wheels 20 which are driven by an internal combustion engine or by electric motor means (not shown). The wheels 20 are attached to the lower ends of the carriage frames 21 which are, in their turn, interconnected by two triangular frames 22 and 22'. These two frames are at their inner, lower ends connected by pivots 12, and at their apices 24 by a hydraulic cylinder system 23, 23', the latter serving to raise or to lower the girder I by shortening or extending the distance between the apices. It can be visualized that by shortening the distance the girder will be lowered. The lengths of the cylinder 23 and the piston rod 23' are so designed that the girder can be lowered as far as the ground, as illustrated in FIGS. 12 and 13 of the accompanying drawings.

In order to exemplify the various applications of the invention, a cotton harvester III is shown suspended from the girder I by means of four trolley wheels 30 which are adapted to run along the rails 10 of the girder and to move the harvester from one end of the girder to the other. The cotton harvester III comprises a framework 31 to the lower ends of which two—or more— cotton harvesting heads 32 of known design are fastened, spaced apart in accordance with the spacing of the rows of cotton plants. Two flexible pipes extend from each head 32 to the pneumatic duct 13 and serve to convey the gathered seed cotton to a movable container IV positioned beyond the end of the structure underneath the spout 14. The air movement required for gathering and conveying the cotton balls from the heads 32 to the container IV is provided by a suction blower or venturi nozzle, mounted either at the end of the girder or inside the framework 31. Two ways of connecting the flexible pipes 34 to the duct 13 are illustrated in FIGS. 4 through 6, and FIGS. 7 through 9, respectively.

FIGS. 4, 5 and 6 illustrate a manner of connecting the flexible pipe 34 to the air duct 13, while permitting the cotton picking equipment—together with the pipe—to travel along the girder I. As shown the duct is in box-like shape, one side of the box comprising two parallel, spaced walls 131 and 132, which are slotted along their entire length by slots 133 and 134. The slot 133 on the outside of the duct is of a width commensurate with the outer diameter of the pipe 34, thus permitting the pipe's movement in the slot along the duct. The slot 134 in the inner wall 132 is wider than the slot 133 and is commensurate with the height of a rectangular sealing plate 135 integral with the pipe 34 and extending perpendicular to the pipe's axis. A similar sealing plate 136 is fastened to the pipe on the outside surface of the duct in close relationship with its outer wall 131. The space between the walls 131 and 132 contains a plurality of flat flaps 137 of roughly triangular shape which are arranged in two adjacent layers and are swingably fastened to the two walls by pivots 138, extending through the apices of the flaps, whereby an equal number of flaps is provided in the respective upper space and lower space between the two walls. The flaps cover the area of the slots 133 and 134 sealingly in partly overlapping alignment, their axes lying respectively parallel and perpendicular to the direction of the slots. This position is obtained by spring means provided between the flaps and the duct (not shown). In the area occupied by the pipe 34 the flaps are swung about their pivots in an upward and a downward direction, respectively, and they are forced back into their normal position by the spring means, as soon as the pipe has moved on along the duct, forcing the adjoining flaps up and down respectively. In the places where the flaps are swung aside, sealing of the duct is obtained by the two sealing plates 135 and 136, which are of sufficient length to cover the gap created by the movement of the pipe.

FIGS. 7, 8 and 9 illustrate a second manner of connecting the flexible pipe 34 to the rectangular duct 13. Spouts 40 protrude out of one wall of the duct; they are equally spaced and are provided on their inside with, normally closed, flap valves 41. The pipe 34 is provided with a socket 42 which fits sealingly onto the spouts 40 and is adapted to be positioned on any of the spouts or to be lifted therefrom by a linear actuator 43. The actuator is rigidly fastened to a U-shaped frame 44 which is adapted to be moved along the duct by means of two pulleys 45, running on the opposite rims of the duct. Two spring-supported flat guides 46 serve to direct the socket onto the respective spout.

The pipe which is carried along by the motion of the cotton harvesting equipment is removed from one spout and connected to the next spout at intervals dictated by the travel speed of the equipment. The actuator 43 is preferably energized by electrical switches mounted at a predetermined distance forward of each spout, these switches being successively switched on by a contact point mounted in a corresponding point of the harvesting equipment.

FIG. 10 illustrates the structure of the invention as provided with a potato-gathering implement V which is adapted to travel along the girder and to load the potatoes onto the conveyor 15 for final delivery to the container IV at the outer end of the structure. FIG. 10 also shows an additional carriage VI supporting the center portion of the girder. This carriage is also self-propelled, and may be attached whenever the load on the girder may become too heavy or the field too wide.

FIG. 11 illustrates an arrangement similar to that of Figure 10. A green-fodder cutting and conveying device VIII is attached to the girder, which delivers the comminuted product to the pneumatic duct 13 for conveyance to the cotainer IV.

The equipment illustrated in FIG. 12 shows the girder I lowered close to the ground, while the conveyor is operated. A tree-shaking apparatus VII is shown to be fastened to the trunk of a fruit tree for shaking the ripe fruit off the branches into an inclined chute IX, which conveys the fruit onto the conveyor 15 for onward transport to the end of the girder.

FIG. 13 shows an end view of the structure with one of the two carriages in the "girder-lowered" position. Comparing this Figure with FIG. 2 of the drawings, it can be clearly seen that the linear actuator 23 has been contracted so as to draw the pivots 24 towards each other, whereby the girder I is lowered close to the ground. In this position a worker can easily load fruit and vegetables, e.g. melons, which he has collected from the ground, onto the conveyor 15 for transport to a vehicle standing at the end of the structure.

In the drawings the carriage wheels 20 are shown and described to be in fixed, parallel position, but in order to permit the free movement of the structure it is proposed that the wheels on one side of each carriage are mounted so as to be swingable about vertical axles, permitting travel along straight and curved paths.

The driving power of the carriages and the equipment mounted on the girder may be supplied by internal combustion engines, electric motor means, diesel-generator plants, or hydraulic transmission or by and combination of electric, hydraulic or mechanical equipment.

It will be understood that the manner of raising and lowering the girder may be by any means other than that described with reference to FIGS. 2 and 13 of the drawings, for instance by rack-and-pinion mechanism, screw-drive or other means known in the art.

The air duct may have a cross section other than the square section shown in the drawings: it may be circular or rectangular, dependent on the space available and the way in which the flexible pipes of the various harvesting equipment are connected thereto.

The rails 10 serving to carry and support the travelling equipment may be replaced by other means of known design as long as they permit smooth and even translation of the various implements along the girder, such as, for instance, a rack-and-pinion assembly.

It is pointed out that many technical details have been omitted in thedrawings in order not to oscure the major features, of the invention and for the added reason that they are mostly known in the art and can be readily designed by any engineer or technician.

What is claimed is:

1. A power-driven structure adapted to carry and more implements across an area without compacting the soil over which the implements are made to travel, the structure comprising:
   a longitudinal, substantially horizontal elongated girder means having opposite end portions which are supported by respective carriages adapted to at least travel in a direction substantially perpendicular to the axis of said girder means,
   said carriages comprising means for raising said girder means to a height permitting passage of said girder means over tall obstacles, and for lowering said girder means to within a small distance from the ground,
   said girder means being provided with:
   mechanical conveying means for carrying material along said girder means and for depositing said carried material to a point beyond one of said carriages,
   pneumatic conveying means for conveying material suitable for pneumatic conveyance to container means positioned beyond one of said carriages,
   guide means for carrying at least one implement over at least part of the length of said girder means, and
   means for conveying materials from said at least one implement to at least one of said mechanical and pneumatic conveying means.

2. The structure of claim 1, wherein:
   each of said carriages comprises an inverted "U" member including two substantially identical L-shaped frames, each of said frames being supported by a pair of wheels, and
   said means for raising and lowering said girder means comprises a linear actuator pivotally coupling together top portions of said frames, said frames being pivotally interconnected by pivot means at lower portions thereof below said linear actuator, said lower portions of said frames also supporting said girder means by a further pivot means such that by shortening said linear actuator, said girder means is lowered and by elongating said linear actuator said girder means is raised relative to ground level.

3. The structure of claim 1, wherein said guide means is coupled to opposite longitudinal sides of said girder means substantially parallel to the axis of said girder means, said guide means supporting and translating said implements over at least part of the length of said girder means.

4. The structure of claim 1, wherein said girder means is of substantially triangular cross section and has an apex strut, said girder means being pivotally connected to said carriages at least two points on its apex strut.

5. The structure of claim 1, further comprising a pipe coupled to and extending along at least a portion of said girder means for conveying at least one of water, liquid fertilizers, insecticides and other liquid material for the treatment of soil and plants.

6. The structure of claim 5, wherein said pipe is mounted inside said girder means.

7. The structure of claim 1, wherein:
   said pneumatic conveying means comprises an elongated air duct, and
   said means for conveying materials from said implements to at least one of said mechanical and pneumatic conveying means comprises a flexible pipe coupled to and in air communication with said air duct, said flexible pipe having an end portion coupled to an implement gathering up object.

8. The structure of claim 7, wherein said air duct comprises a plurality of spaced pipe nozzles projecting therefrom, and wherein said flexible pipe comprises a socket fitting sealingly mountable on any of said nozzles, means being provided for placing and removing said socket fitting from any of said nozzles and placing it onto an adjoining nozzle at the rate of progress of an implement carried by said guide means.

9. The structure of claim 8, wherein said nozzles are substantially equally spaced along said air duct.

10. The structure of claim 8, wherein said air duct has a substantially rectangular cross section.

11. The structure of claim 10, wherein said nozzles project from one side of said substantially rectangular air duct.

12. The structure of claim 7, wherein said air duct has a substantially rectangular cross section.

13. The structure of claim 12 wherein said air duct has one side of its substantially rectangular periphery which is longitudinally slotted by a slot of a width permitting said flexible pipe to be inserted in said air duct, and wherein said slot is covered by a plurality of hinged flaps to make said slot substantially airtight.

14. The structure of claim 1, wherein said at least one implement comprises a cotton harvester mounted on said girder means.

15. The structure of claim 1, wherein said at least one implement comprises a green-fodder harvester mounted on said girder means.

16. The structure of claim 1, further comprising a fruit-gathering chute mounted on said girder means for conveying fruit to said mechanical conveying means.

17. The structure of claim 16, further comprising a tree shaker for shaking a tree to cause a product from said tree to fall off of said tree onto said fruit-gathering chute.

18. The structure of claim 1, wherein said mechanical conveying means comprises a belt-conveyor mounted on said girder means.

19. The structure of claim 1, wherein said means for raising and lowering said girder means maintains said girder means substantially horizontal when said girder means is in its raised position.

20. The structure of claim 19, wherein said means for raising and lowering said girder means maintains said girder means substantially horizontal when said girder means is in its lowered position.

* * * * *